United States Patent Office 3,210,389
Patented Oct. 5, 1965

3,210,389
19-HALO-Δ⁴-10α-ANDROSTEN-17β-OL-3-ONE
Albert Bowers, Mexico City, Mexico, assignor to Syntex Corporation, Panama, Panama, a corporation of Panama
No Drawing. Filed Dec. 20, 1962, Ser. No. 246,015
The portion of the term of the patent subsequent to August 20, 1980, has been disclaimed
23 Claims. (Cl. 260—397.4)

The present invention relates to novel cyclopentanophenanthrene derivatives and to a process for the production thereof.

More particularly, the present invention relates to novel 19-halo-Δ⁴-10α-androsten-17β-ol-3-one derivatives.

The novel compounds of the present invention are represented by the following formulae:

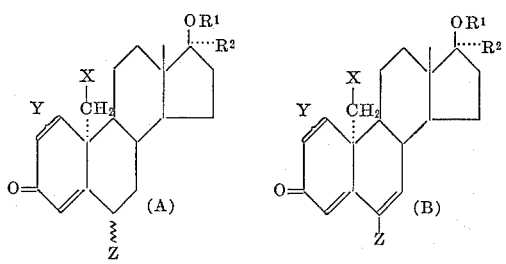

In the above formulae, R¹ represents hydrogen or a hydrocarbon carboxylic acyl group of less than 12 carbon atoms; R² represents hydrogen, lower alkyl, lower alkenyl or lower alkinyl; Z represents hydrogen, methyl chlorine or fluorine, all having α or β configurations in formula A; Y represents a double bond or a saturated linkage each between C-1 and C-2; and X represents bromine, chlorine or fluorine.

The acyl group is derived from hydrocarbon carboxylic acids containing less than 12 carbon atoms, which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetatae, t-butylacetate, phenoxyacetate, cyclopentylpropionate, aminoacetatae, and β-chloropropionate.

The compounds represented by the above formulae have anabolic-androgenic properties, and inhibit the production of pituitary gonadotrophic hormones and A.C.T.H. In addition, they exhibit anti-estrogenic activity and lower the blood, liver and adrenal cholesterol levels. Furthermore, they are very useful in the control of fertility and psychotic conditions, and stimulate the appetite.

The 17α-alkenyl or alkinyl compounds also exhibit progestational activity.

The novel compounds of the present invention are prepared by the process exemplified as follows:

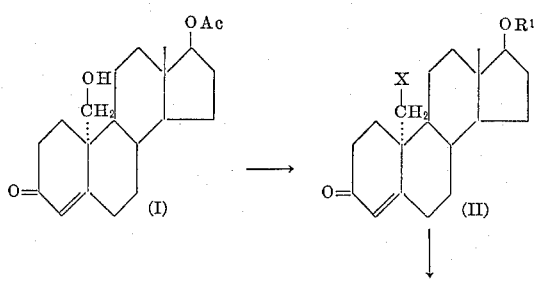

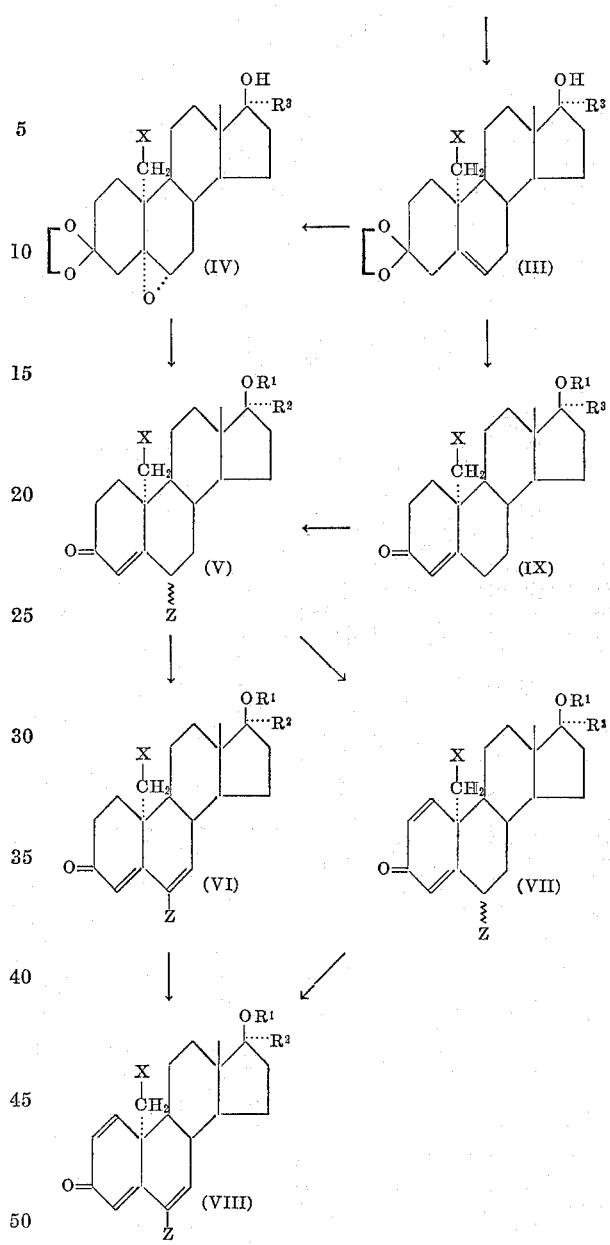

In the above formulas R¹, R², X and Z have the same meaning as previously set forth; R³ represents hydrogen, lower alkyl or lower alkinyl.

In practicing the process outlined above, the starting 17-acetate of 19-hydroxy-10α-testosterone (I) is treated with an α-fluorinated amine, such as 2-chloro-1,1,2-trifluoro-trimethylamine in a non-polar organic solvent, such as methylene chloride to produce the acetate of 19-fluoro-Δ⁴-10α-androsten-17β-ol-3-one (II: X=fluorine).

Alternatively, upon conventional treatment of the starting compound (I) with tosyl chloride in pyridine, there is obtained the corresponding 19-tosylate which is treated with an alkali metal halide, such as lithium bromide, chloride or fluoride, or silver fluoride, in a suitable solvent, such as dimethyl formamide or acetonitrile, thus affording the corresponding 19-fluoro, chloro or bromo-Δ⁴-10α-androsten 17β-ol-3-one acetate (II: R¹=acetyl) which upon conventional saponification affords the corresponding 17β-free alcohol (II: R¹=H).

The Δ⁴-3-ketones (II) upon reaction with ethyleneglycol, in the presence of p-toluenesulfonic acid yield the corresponding 3-cycloethylenedioxy-$\Delta^5$-10α-androstene compounds (III: $R^3$=H) which upon treatment with chromium trioxide in pyridine afford the corresponding 3-cycloethylenedioxy-$\Delta^5$-10α-androsten-17-ones.

The latter 17-ketones are treated with a lower alkyl magnesium halide, such as methyl magnesium bromide, in a solvent inert to the reagent, e.g., ether, to produce the corresponding 19-halo-3-cycloethylenedioxy-17α-lower alkyl-$\Delta^5$-10α-androsten-17β-ol derivatives (III: $R^3$=lower alkyl).

When treating the 3-cycloethylenedioxy-$\Delta^5$-10α-androsten-17-ones with a current of a lower alkine-1, such as acetylene, in the presence of potassium t-amyloxide, there are obtained the corresponding 19-halo-3-cycloethylenedioxy-17α-lower alkinyl-$\Delta^5$-10α-androsten-17β-ol-derivatives (III: $R^3$=lower alkinyl).

The 3-cycloethylenedioxy-$\Delta^5$-steroids (III) upon treatment with acid under conventional conditions, yield the corresponding $\Delta^4$-3-ketones (IX).

The 3-cycloethylenedioxy-$\Delta^5$-compounds (III), upon treatment with an organic peracid such as monoperphthalic acid, in a suitable solvent, e.g., chloroform, give the corresponding 3-cycloethylenedioxy-19-halo-5α,6α-oxido derivatives (IV).

Upon reaction of the latter 3-cycloethylenedioxy-5α,6α-oxido compounds with methyl magnesium bromide in an inert solvent, such as ether or tetrahydrofuran, followed by conventional working up and treatment of the resulting residues with a mineral acid, such as 8% sulfuric acid, and thereafter with thionyl chloride in pyridine at about $-10°$ C. for approximately 4 minutes, there are obtained the corresponding 19-halo-6β-methyl-$\Delta^4$-10α-androsten-17β-ol-3-one derivatives (V: Z=β-methyl). These 6β-methyl derivatives are converted into the corresponding 6α-methyl derivatives (V: Z=α-methyl) by treatment with an alkali metal hydroxide.

When treating the 3-cycloethylenedioxy-5α,6α-oxido compounds (IV) with anhydrous hydrogen chloride in a suitable organic solvent, e.g., ethyl acetate or acetic acid, there are produced the corresponding 6α-chloro-19-halo-$\Delta^4$-10α-androsten-17β-ol-3-one derivatives (V: Z=α-chlorine).

Upon reaction of the 3-cycloethylenedioxy-5α,6α-oxido compounds (IV) with anhydrous hydrogen fluoride, preferably in the presence of boron trifluoride etherate, followed by treatment with hydrogen chloride, there are produced the corresponding 6α-fluoro-19-halo-$\Delta^4$-10α-androsten-17β-ol-3-one derivatives (V: Z=α-fluorine).

The 19-halo-$\Delta^4$-10α-androsten-17β-ol-3-one derivatives (II) are treated with ethyl orthoformate in the presence of p-toluenesulfonic acid and in an inert solvent, thus affording the corresponding 19-halo-3-ethoxy-$\Delta^{3,5}$-10α-androstadien-17β-ol derivatives, which upon reaction with approximately 1 molar equivalent of an N-chloro amide or imide, such as N-chloro succinimide in the presence of sodium acetate and acetic acid yield the corresponding 6β-chloro-19-halo-$\Delta^4$-10α-androsten-17β-ol-3-one derivatives (V: Z=β-chlorine).

The aforesaid 19-halo-3-ethoxy-$\Delta^{3,5}$-10α-androstadien-17β-ol derivatives are treated with perchloryl fluoride in dimethyl formamide to produce the corresponding 6β-fluoro-19-halo-$\Delta^4$-10α-androsten-17β-ol-3-one derivatives (V: Z=β-fluorine).

The 19-halo-17α-alkinyl-$\Delta^4$-10α-androsten-17β-ol-3-one compounds of the present invention (V: $R^2$=alkinyl) are converted into the corresponding 19-halo-17α-alkenyl-$\Delta^4$-10α-androsten-17β-ol-3-one derivatives (V: $R^2$=alkenyl), by hydrogenation with approximately 1 molar equivalent of hydrogen, in pyridine solution in the presence of a suitable catalyst, such as 2% palladium on calcium carbonate at room temperature and under a pressure of about 1 atmosphere.

The 19-halo-$\Delta^4$-10α-androsten-17β-ol-3-one compounds of the present invention (V) upon treatment with ethyl orthoformate in an inert solvent, e.g., dioxane, and in the presence of p-toluenesulfonic acid, furnish the corresponding 19-halo-3-ethoxy-$\Delta^{3,5}$-10α-androstadiene derivatives, which are treated with approximately 1 molar equivalent of 2,3-dichloro-5,6-dicyano-1,4-benzoquinone, in the presence of a catalytic amount of acid and in an inert solvent to give the corresponding 19-halo-$\Delta^{4,6}$-10α-androstadien-17β-ol-3-one derivatives (VI).

When treating the 19-halo-$\Delta^4$-10α-androsten-17β-ol-3-one compounds (V) with 2,3-dichloro-5,6-dicyano-1,4-benzoquinone in an inert solvent such as dioxane, preferably at reflux temperature, for a period of time of about 10 hours, there are produced the corresponding 19-halo-$\Delta^{1,4}$-10α-androstadien-17β-ol-3-one compounds.

The aforesaid $\Delta^{4,6}$-androstadiene compounds (VI) are converted into the corresponding $\Delta^{1,4,6}$-androstatriene derivatives by further treatment with 2,3-dichloro-5,6-dicyano-1,4-benzoquinone, under the same conditions as specified hereinbefore for the production of the $\Delta^{1,4}$-derivatives (VI).

The compounds of the present invention having a secondary hydroxyl, namely the 17α-unsubstituted-17β-alcohols are conventionally acylated in pyridine with an acylating agent, such as an anhydride or an acyl chloride derived from hydrocarbon carboxylic acids of the previously defined type, to produce the corresponding acylates.

The compounds of the present invention having a tertiary hydroxyl present in the molecule, i.e., the 17α-substituted-17β-alcohols, are conventionally esterified, in the presence of p-toluenesulfonic acid with an acylating agent such as acetic anhydride or caproic anhydride, thus affording the corresponding esters.

The following specific examples serve to illustrate, but are not intended to restrict the scope of the present invention:

PREPARATION 1

A mixture of 1 g. of 19-hydroxy-10α-testosterone (F. Sondheimer et al., Tetr. Letters, No. 22, 38 [1960]), 3 g. of triphenylmethyl chloride and 15 cc. of pyridine was heated on a steam bath for 2 hours, then it was cooled to 5° C. and 2 cc. of acetic anhydride were added. The resulting mixture was kept at the same temperature for 24 hours, then it was poured slowly into ice-water and the resulting precipitate collected by filtration and dried. The dry solid was mixed thoroughly with 20 cc. of acetic acid and there were added 3 cc. of a saturated solution of hydrogen bromide in acetic acid. The resulting mixture was stirred for 3 minutes, then poured into ice water and the formed precipitate collected by filtration, washed with water, dried and crystallized from acetone-hexane, thus yielding the 17-acetate of 19-hydroxy-10α-testosterone.

*Example I*

To a solution of 5 g. of the 17-acetate of 19-hydroxy-10α-testosterone in 25 cc. of methylenechloride, were added 5 g. of 2-chloro-1,1,2-trifluoro triethyl amine (Yarovenko et al., Journal of General Chemistry of the U.S.S.R. 2125, 29 (1959)). 15 cc. of the solvent were evaporated under anhydrous conditions and the resulting mixture was kept overnight at room temperature. The reaction mixture was evaporated to dryness and the residue was chromatographed on alumina, thus yielding compound No. 1, namely, the acetate of 19-fluoro-$\Delta^4$-10α-androsten-17β-ol-3-one.

*Example II*

A solution of 3.4 g. of the 17-acetate of 19-hydroxy-10α-testosterone in 20 cc. of a mixture chloroform-pyridine 9:1 was cooled to 0° C. and mixed with 1.4 g. of tosyl chloride which was added in small portions. The reaction mixture was kept for 14 hours at 0° C. and then it was washed with dilute hydrochloric acid, water and sodium bicarbonate solution and the chloroform was evaporated under vacuum. The residue, consisted of the crude 19-tosylate. The crude product was dried in vacuum, dissolved in 20 cc. of acetonitrile and treated dropwise with 1.4 g. of silver fluoride dissolved in 3 cc. of water. After a short time, silver iodine started to separate leaving the 19-fluoro derivative in solution. The mixture was kept for 24 hours at room temperature and filtered. Concentration of the filtrate under vacuum gave a crude product which after crystallization from methanol-acetone yielded the acetate of 19-fluoro-$\Delta^4$-10$\alpha$-androsten-17$\beta$-ol-3-one identical with the final product of the foregoing example.

*Example III*

A solution of 5 g. of 17-acetate of 19-hydroxy-10$\alpha$-testosterone in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 19-tosylate of the starting compound.

A suspension of 10 g. of lithium fluoride in 50 cc. of dimethyl formamide was heated to boiling and then a solution of 2 g. of the crude tosylate in 10 cc. of dimethyl formamide was added. The mixture was refluxed for 5 hours, cooled and poured into water. The formed precipitate was filtered off and crystallized to give the acetate of 19-fluoro-$\Delta^4$-10$\alpha$-androsten-17$\beta$-ol-3-one, identical with the final products of the above examples.

*Example IV*

The 17-acetate of 19-hydroxy-10$\alpha$-testosterone was treated following the procedure described in Example III except that lithium chloride was used instead of lithium fluoride, thus affording the acetate of 19-chloro-$\Delta^4$-10$\alpha$-androsten-17$\beta$-ol-3-one (Cpd. No. 2).

*Example V*

A suspension of 1 g. of the acetate of 19-fluoro-$\Delta^4$-10$\alpha$-androsten-17$\beta$-ol-3-one (Cpd. No. 1) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19-fluoro-$\Delta^4$-10$\alpha$-androsten-17$\beta$-ol-3-one (Cpd. No. 3).

The compound No. 2 was treated in accordance with the above procedure, thus affording 19-chloro-$\Delta^4$-10$\alpha$-androsten-17$\beta$-ol-3-one (Cpd. No. 4).

*Example VI*

A mixture of 5 g. of compound No. 3, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the contiuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy-19-fluoro-$\Delta^5$-10$\alpha$-androsten-17$\beta$-ol (Cpd. No. 5).

When treating Compound No. 4 by the same procedure, there was obtained 3-cyclo-ethylenedioxy-19-chloro-$\Delta^5$-10$\alpha$-androsten-17$\beta$-ol (Cpd. No. 6).

*Example VII*

A solution of 6 g. of Compound No. 5 in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-cycloethylenedioxy-19-fluoro-$\Delta^5$-10$\alpha$-androsten-17-one.

A solution of 5 g. of the latter ketone in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloridehexane afforded 3-cycloethylenedioxy-19-fluoro-17$\alpha$-methyl-$\Delta^5$-10$\alpha$-androsten-17$\beta$-ol (Cpd. No. 7).

When treating compound No. 6 by the above procedures, there were successively obtained: 3-cycloethylenedioxy-19-chloro-$\Delta^5$-10$\alpha$-androsten-17-one and 3-cycloethylenedioxy-19-chloro-17$\alpha$-methyl-$\Delta^5$-10$\alpha$-androsten-17$\beta$-ol (Cpd. No. 8).

*Example VIII*

A solution of 1 g. of 3-cycloethylenedioxy-19-fluoro-$\Delta^5$-10$\alpha$-androsten-17-one, in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded 3-cycloethylenedioxy-19-fluoro-17$\alpha$-ethinyl-$\Delta^5$-10$\alpha$-androsten-17$\beta$-ol (Cpd. No. 9).

By the same procedure there was treated 3-cycloethylenedioxy-19-chloro-$\Delta^5$-10$\alpha$-androsten-17-one, to give 3-cycloethylenedioxy-19-chloro-17$\alpha$-ethinyl-$\Delta^5$-10$\alpha$-androsten-17$\beta$-ol (Cpd. No. 10).

*Example IX*

A solution of 500 mg. of Compound No. 7 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-fluoro-17$\alpha$-methyl-$\Delta^4$-10$\alpha$-androsten-17$\beta$-ol-3-one (Cpd. No. 11).

When treating Compounds Nos. 8, 9 and 10, by the above procedure, there were obtained successively:

Cpd.
No.
12.—19-chloro-17$\alpha$-methyl-$\Delta^4$-10$\alpha$-androsten-17$\beta$-ol-3-one,
13.—19-fluoro-17$\alpha$-ethinyl-$\Delta^4$-10$\alpha$-androsten-17$\beta$-ol-3-one,
14.—19-chloro-17$\alpha$-ethinyl-$\Delta^4$-10$\alpha$-androsten-17$\beta$-ol-3-one.

*Example X*

A solution of 2.5 g. of 3-cycloethylenedioxy-19-fluoro-$\Delta^5$-10$\alpha$-androsten-17$\beta$-ol (Cpd. No. 5) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3-cycloethylenedioxy-19-fluoro-5$\alpha$,6$\alpha$-oxido-10$\alpha$-androsten-17$\beta$-ol (Cpd. No. 15).

The Compounds Nos. 6 to 10, inclusive, were treated following the above procedure, thus furnishing respectively:

Cpd.
No.
16.—3-cycloethylenedioxy-19-chloro-5α,6α-oxido-10α-androstan-17β-ol.
17.—3-cycloethylenedioxy-19-fluoro-17α-methyl-5α,6α-oxido-10α-androstan-17β-ol.
18.—3-cycloethylenedioxy-19-chloro-17α-methyl-5α,6α-oxido-10α-androstan-17β-ol.
19.—3-cycloethylenedioxy-19-fluoro-17α-ethinyl-5α,6α-oxido-10α-androstan-17β-ol.
20.—3-cycloethylenedioxy-19-chloro-17α-ethinyl-5α,6α-oxido-10α-androstan-17β-ol.

*Example XI*

To a solution of 20 cc. of 4 N methylmagnesium bromide in ether was added, with stirring, a solution of 1 g. of 3-cycloethylenedioxy-19-fluoro-5α,6α-oxido-10α-androstan-17β-ol (Cpd. No. 15) in 30 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 200 cc. of a saturated solution of ammonium chloride was added slowly to the cooled mixture which was then stirred for 15 minutes before transfer to a separatory funnel. It was diluted with ethyl acetate, the organic layer was separated, dried and evaporated to dryness, thus affording a solid residue.

A solution of the above residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and air dried.

A solution of the dry precipitate in 7 cc. of dry pyridine was cooled to −10° C., treated with 0.4 cc. of thionyl chloride and the mixture allowed to stand for 4 minutes at this temperature. Ice-water was added and the crystalline precipitate was filtered, washed and dried, yielding 19-fluoro-6β-methyl-Δ$^4$-10α-androsten-17β-ol-3-one (Cpd. No. 21).

The Compounds Nos. 16 to 20, inclusive, were treated by the above procedure, thus furnishing respectively:

Cpd.
No.
22.—19-chloro-6β-methyl-Δ$^4$-10α-androsten-17β-ol-3-one.
23.—19-fluoro-6β,17α-dimethyl-Δ$^4$-10α-androsten-17β-ol-3-one.
24.—19-chloro-6β,17α-dimethyl-Δ$^4$-10α-androsten-17β-ol-3-one.
25.—19-fluoro-6β-methyl-17α-ethinyl-Δ$^4$-10α-androsten-17β-ol-3-one.
26.—19-chloro-6β-methyl-17α-ethinyl-Δ$^4$-10α-androsten-17β-ol-3-one.

*Example XII*

1 g. of 19-fluoro-6β-methyl-Δ$^4$-10α-androsten-17β-ol-3-one (Cpd. No. 21) was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetone-hexane yielded 19-fluoro-6α-methyl-Δ$^4$-10α-androsten-17β-ol-3-one (Cpd. No. 27).

Following the same procedure, the Compounds Nos. 22 to 26, inclusive, were converted respectively into:

Cpd.
No.
28.—19-chloro-6α-methyl-Δ$^4$-10α-androsten-17β-ol-3-one.
29.—19-fluoro-6α,17α-dimethyl-Δ$^4$-10α-androsten-17β-ol-3-one.
30.—19-chloro-6α,17α-dimethyl-Δ$^4$-10α-androsten-17β-ol-3-one.
31.—19-fluoro-6α-methyl-17α-ethinyl-Δ$^4$-10α-androsten-17β-ol-3-one.
32.—19-chloro-6α-methyl-17α-ethinyl-Δ$^4$-10α-androsten-17β-ol-3-one.

*Example XIII*

Into a suspension of 1 g. of 3-cycloethylenedioxy-19-fluoro-5α,6α-oxido-10α-androstan-17β-ol (Cpd. No. 15) in 35 cc. of glacial acetic acid, was passed a slow stream of dry hydrochloric acid; after 10 minutes all the solid material was dissolved. The gas was passed through the reaction mixture for a total of 5 hours. The solution was concentrated to about one-third its initial volume by distillation under reduced pressure at 35° C., then it was poured into ice-water. The precipitate formed was collected, washed with water to neutrality and dried. Recrystallization from methylene chloride afforded 6α-chloro-19-fluoro-Δ$^4$-10α-androsten-17β-ol-3-one (Cpd. No. 33).

The Compounds Nos. 16 to 20, inclusive, were treated by the above procedure, thus yielding correspondingly:

Cpd.
No.
34.—6α,19-dichloro-Δ$^4$-10α-androsten-17β-ol-3-one.
35.—6α-chloro-19-fluoro-17α-methyl-Δ$^4$-10α-androsten-17β-ol-3-one.
36.—6α,19-dichloro-17α-methyl-Δ$^4$-10α-androsten-17β-ol-3-one.
37.—6α-chloro-19-fluoro-17α-ethinyl-Δ$^4$-10α-androsten-17β-ol-3-one.
38.—6α,19-dichloro-17α-ethinyl-Δ$^4$-10α-androsten-17β-ol-3-one.

*Example XIV*

2.8 cc. of boron trifluoride etherate was slowly added with stirring to 220 mg. of anhydrous hydrogen fluoride cooled in an acetone-Dry Ice bath.

To a solution of 1 g. of Compound No. 15 in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was dissolved in 50 cc. of ethyl acetate and there was added 1 cc. of concentrated hydrochloric acid. The resulting mixture was kept at room temperature for 5 hours, then it was washed abundantly with water. The organic layer was separated, dried over anhydrous sodium sulfate and evaporated to dryness. Recrystallization from acetone-hexane yielded 6α,19-difluoro-Δ$^4$-10α-androsten-17β-ol-3-one (Cpd. No. 39).

The Compounds Nos. 16 to 20, inclusive, were treated by the above procedure, thus affording respectively:

Cpd.
No.
40.—6α-fluoro-19-chloro-Δ$^4$-10α-androsten-17β-ol-3-one.
41.—6α,19-difluoro-17α-methyl-Δ$^4$-10α-androsten-17β-ol-3-one.
42.—6α-fluoro-19-chloro-17α-methyl-Δ$^4$-10α-androsten-17β-ol-3-one.
43.—6α,19-difluoro-17α-ethinyl-Δ$^4$-10α-androsten-17β-ol-3-one.
44.—6α-fluoro-19-chloro-17α-ethinyl-Δ$^4$-10α-androsten-17α-ol-3-one.

*Example XV*

A suspension of 1 g. of 19-fluoro-Δ$^4$-10α-androsten-17β-ol-3-one (Cpd. No. 3) in 7.5 cc. of anhydrous peroxide free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-19-fluoro-$\Delta^{3,5}$-androstadien-17$\beta$-ol (Cpd. No. 45).

The Compounds Nos. 4, 11, 12, 13 and 14 were treated by the same procedure, thus furnishing respectively:

Cpd.
No.
46.—3-ethoxy-19-chloro-$\Delta^{3,5}$-10$\alpha$-androstadien-17$\beta$-ol.
47.—3-ethoxy-19-fluoro-17$\alpha$-methyl-$\Delta^{3,5}$-10$\alpha$-androstadien-17$\beta$-ol.
48.—3-ethoxy-19-chloro-17$\alpha$-methyl-$\Delta^{3,5}$-10$\alpha$-androstadien-17$\beta$-ol.
49.—3-ethoxy-19-fluoro-17$\alpha$-ethinyl-$\Delta^{3,5}$-10$\alpha$-androstadien-17$\beta$-ol.
50.—3-ethoxy-19-chloro-17$\alpha$-ethinyl-$\Delta^{3,5}$-10$\alpha$-androstadien-17$\beta$-ol.

*Example XVI*

A mixture of 5 g. of 3-ethoxy-19-fluoro-$\Delta^{3,5}$-10$\alpha$-androstadien-17$\beta$-ol (Cpd. No. 45), 2 g. of anhydrous sodium acetate and 100 cc. of acetone, was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6$\beta$-chloro-19-fluoro-$\Delta^4$-10$\alpha$-androsten-17$\beta$-ol-3-one (Cpd. No. 51).

The Compounds Nos. 46 to 50, inclusive, were treated by the above procedure, thus yielding correspondingly:

Cpd.
No.
52.—6$\beta$,19-dichloro-$\Delta^4$-10$\alpha$-androsten-17$\beta$-ol-3-one.
53.—6$\beta$-chloro-19-fluoro-17$\alpha$-methyl-$\Delta^4$-10$\alpha$-androsten-17$\beta$-ol-3-one.
54.—6$\beta$,19-dichloro-17$\alpha$-methyl-$\Delta^4$-10$\alpha$-androsten-17$\beta$-ol-3-one.
55.—6$\beta$-chloro-19-fluoro-17$\alpha$-ethinyl-$\Delta^4$-10$\alpha$-androsten-17$\beta$-ol-3-one.
56.—6$\beta$,19-dichloro-17$\alpha$-ethinyl-$\Delta^4$-10$\alpha$-androsten-17$\beta$-ol-3-one.

*Example XVII*

1 g. of 3-ethoxy-19-fluoro-$\Delta^{3,5}$-androstadien-17$\beta$-ol (Cpd. No. 45) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6$\beta$,19-difluoro-$\Delta^4$-androsten-17$\beta$-ol-3-one (Cpd. No. 57).

Upon treatment of Compounds Nos. 46 to 50, inclusive, by the same procedure, there were respectively produced:

Cpd.
No.
58.—6$\beta$-fluoro-19-chloro-$\Delta^4$-androsten-17$\beta$-ol-3-one.
59.—6$\beta$,19-difluoro-17$\alpha$-methyl-$\Delta^4$-androsten-17$\beta$-ol-3-one.
60.—6$\beta$-fluoro-19-chloro-17$\alpha$-methyl-$\Delta^4$-androsten-17$\beta$-ol-3-one.
61.—6$\beta$,19-difluoro-17$\alpha$-ethinyl-$\Delta^4$-androsten-17$\beta$-ol-3-one.
62.—6$\beta$-fluoro-19-chloro-17$\alpha$-ethinyl-$\Delta^4$-androsten-17$\beta$-ol-3-one.

*Example XVIII*

A solution of 1 g. of 19-fluoro-17$\alpha$-ethinyl-$\Delta^4$-10$\alpha$-androsten-17$\beta$-ol-3-one (Cpd. No. 13) in 40 cc. of pyridine was hydrogenated at 25° C. and 570 mm. in the presence of 400 mg. of pre-hydrogenated 2% palladium calcium carbonate catalyst.

When 1.1 molar equivalents of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 19-fluoro-17$\alpha$-vinyl-$\Delta^4$-10$\alpha$-androsten-17$\beta$-ol-3-one (Cpd. No. 63).

Following exactly the same procedure, there were treated the Compounds Nos. 14, 25, 26, 31, 32, 37, 38, 43, 44, 55, 56, 61 and 62, yielding respectively:

Cpd.
No.
64.—19 - chloro - 17$\alpha$ - vinyl - $\Delta^4$ - 10$\alpha$ - androsten - 17$\beta$-ol-3-one.
65.—19 - fluoro - 6$\beta$ - methyl - 17$\alpha$ - vinyl - $\Delta^4$ - 10$\alpha$-androsten-17$\beta$-ol-3-one.
66.—19 - chloro - 6$\beta$ - methyl - 17$\alpha$ - vinyl - $\Delta^4$ - 10$\alpha$-androsten-17$\beta$-ol-3-one.
67.—19 - fluoro - 6$\alpha$ - methyl - 17$\alpha$ - vinyl - $\Delta^4$ - 10$\alpha$-androsten-17$\beta$-ol-3-one.
68.—19 - chloro - 6$\alpha$ - methyl 17$\alpha$ - vinyl - $\Delta^4$ - 10$\alpha$-androsten-17$\beta$-ol-3-one.
69.—6$\alpha$ - chloro - 19 - fluoro - 17$\alpha$ - vinyl - $\Delta^4$ - 10$\alpha$-androsten-17$\beta$-ol-3-one.
70.—6$\alpha$,19 - dichloro - 17$\alpha$ - vinyl - $\Delta^4$ - 10$\alpha$ - androsten-17$\beta$-ol-3-one.
71.—6$\alpha$,19 - difluoro - 17$\alpha$ - vinyl - $\Delta^4$ - 10$\alpha$ - androsten-17$\beta$-ol-3-one.
72.—6$\alpha$ - fluoro - 19 - chloro - 17$\alpha$ - vinyl - $\Delta^4$ - 10$\alpha$-androsten-17$\beta$-ol-3-one.
73.—6$\beta$ - chloro - 19 - fluoro - 17$\alpha$ - vinyl - $\Delta^4$ - 10$\alpha$-androsten-17$\beta$-ol-3-one.
74.—6$\beta$,19 - dichloro - 17$\alpha$ - vinyl - $\Delta^4$ - 10$\alpha$ - androsten-17$\beta$-ol-3-one.
75.—6$\beta$,19 - difluoro - 17$\alpha$ - vinyl - $\Delta^4$ - 10$\alpha$ - androsten-17$\beta$-ol-3-one.
76.—6$\beta$ - fluoro - 19 - chloro - 17$\alpha$ - vinyl - $\Delta^4$ - 10$\alpha$-androsten-17$\beta$-ol-3-one.

*Example XIX*

A suspension of 1 g. of 19-fluoro-$\Delta^4$-10$\alpha$-androsten-17$\beta$-ol-3-one (Cpd. No. 3) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone hexane afforded 3-ethoxy-19-fluoro-$\Delta^{3,5}$-10$\alpha$-androstadien-17$\beta$-ol, identical with Compound No. 45 obtained in Example IX.

A solution of 1 g. of the latter compound in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated 2,3-dichloro-5,6-dicyanohydroquinone was filtered off and 100 cc. of methylene chloride were added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 19-fluoro-Δ$^{4,6}$-10α-androstadien-17β-ol-3-one (Cpd. No. 77).

The Compounds Nos. 4, 11, 12, 13 and 14, were treated following the same procedure, thus yielding respectively:

Cpd.
No.
78.—19-chloro-Δ$^{4,6}$-10α-androstadien-17β-ol-3-one.
79.—19-fluoro-17α-methyl-Δ$^{4,6}$-10α-androstadien-17β-ol-3-one.
80.—19-chloro-17α-methyl-Δ$^{4,6}$-10α-androstadien-17β-ol-3-one.
81.—19-fluoro-17α-ethinyl-Δ$^{4,6}$-10α-androstadien-17β-ol-3-one.
82.—19-chloro-17α-ethinyl-Δ$^{4,6}$-10α-androstadien-17β-ol-3-one.

*Example XX*

The Compounds Nos. 21 to 26, inclusive, were treated in accordance with the preceding example, thus affording respectively:

Cpd.
No.
83.—19-fluoro-6-methyl-Δ$^{4,6}$-10α-androstadien-17β-ol-3-one.
84.—19-chloro-6-methyl-Δ$^{4,6}$-10α-androstadien-17β-ol-3-one.
85.—19-fluoro-6,17α-dimethyl-Δ$^{4,6}$-10α-androstadien-17β-ol-3-one.
86.—19-chloro-6,17α-dimethyl-Δ$^{4,6}$-10α-androstadien-17β-ol-3-one.
87.—19-fluoro-6-methyl-17α-ethinyl-Δ$^{4,6}$-10α-androstadien-17β-ol-3-one.
88.—19-chloro-6-methyl-17α-ethinyl-Δ$^{4,6}$-10α-androstadien-17β-ol-3-one.

*Example XXI*

Upon treatment of Compounds Nos. 33 to 44, inclusive, by the procedure of Example XIX, there were respectively produced:

Cpd.
No.
89.—6-chloro-19-fluoro-Δ$^{4,6}$-10α-androstadien-17β-ol-3-one.
90.—6,19-dichloro-Δ$^{4,6}$-10α-androstadien-17β-ol-3-one.
91.—6-chloro-19-fluoro-17α-methyl-Δ$^{4,6}$-10α-androstadien-17β-ol-3-one.
92.—6,19-dichloro-17α-methyl-Δ$^{4,6}$-10α-androstadien-17β-ol-3-one.
93.—6-chloro-19-fluoro-17α-ethinyl-Δ$^{4,6}$-10α-androstadien-17β-ol-3-one.
94.—6,19-dichloro-17α-ethinyl-Δ$^{4,6}$-10α-androstadien-17β-ol-3-one.
95.—6,19-difluoro-Δ$^{4,6}$-10α-androstadien-17β-ol-3-one.
96.—6-fluoro-19-chloro-Δ$^{4,6}$-10α-androstadien-17β-ol-3-one.
97.—6,19-difluoro-17α-methyl-Δ$^{4,6}$-10α-androstadien-17β-ol-3-one.
98.—6-fluoro-19-chloro-17α-methyl-Δ$^{4,6}$-10α-androstadien-17β-ol-3-one.
99.—6,19-difluoro-17α-ethinyl-Δ$^{4,6}$-10α-androstadien-17β-ol-3-one.
100.—6-fluoro-19-chloro-17α-ethinyl-Δ$^{4,6}$-10α-androstadien-17β-ol-3-one.

*Example XXII*

The Compounds Nos. 63 and 64 were treated according to Example XIX, thus furnishing respectively: 19-fluoro-17α-vinyl-Δ$^{4,6}$-10α-androstadien-17β-ol-3-one (Cpd. No. 101) and 19-chloro-17α-vinyl-Δ$^{4,6}$-10α-androstadien-17β-ol-3-one (Cpd. No. 102).

*Example XXIII*

A mixture of 500 mg. of 19-fluoro-Δ$^4$-10α-androsten-17β-ol-3-one (Cpd. No. 3), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19-fluoro-Δ$^{1,4}$-10α-androstadien-17β-ol-3-one (Cpd. No. 103).

The Compounds Nos. 4, 11, 12, 13 and 14, were treated in accordance with the above procedure, thus furnishing respectively:

Cpd.
No.
104.—19-chloro-Δ$^{1,4}$-10α-androstadien-17β-ol-3-one.
105.—19-fluoro-17α-methyl-Δ$^{1,4}$-10α-androstadien-17β-ol-3-one.
106.—19-chloro-17α-methyl-Δ$^{1,4}$-10α-androstadien-17β-ol-3-one.
107.—19-fluoro-17α-ethinyl-Δ$^{1,4}$-10α-androstadien-17β-ol-3-one.
108.—19-chloro-17α-ethinyl-Δ$^{1,4}$-10α-androstadien-17β-ol-3-one.

*Example XXIV*

The Compounds Nos. 21 to 32, inclusive, were treated in accordance with the preceding example, thus affording respectively:

Cpd.
No.
109.—19-fluoro-6β-methyl-Δ$^{1,4}$-10α-androstadien-17β-ol-3-one.
110.—19-chloro-6β-methyl-Δ$^{1,4}$-10α-androstadien-17β-ol-3-one.
111.—19-fluoro-6β,17α-dimethyl-Δ$^{1,4}$-10α-androstadien-17β-ol-3-one.
112.—19-chloro-6β,17α-dimethyl-Δ$^{1,4}$-10α-androstadien-17β-ol-3-one.
113.—19-fluoro-6β-methyl-17α-ethinyl-Δ$^{1,4}$-10α-androstadien-17β-ol-3-one.
114.—19-chloro-6β-methyl-17α-ethinyl-Δ$^{1,4}$-10α-androstadien-17β-ol-3-one.
115.—19-fluoro-6α-methyl-Δ$^{1,4}$-10α-androstadien-17β-ol-3-one.
116.—19-chloro-6α-methyl-Δ$^{1,4}$-10α-androstadien-17β-ol-3-one.
117.—19-fluoro-6α,17α-dimethyl-Δ$^{1,4}$-10α-androstadien-17β-ol-3-one.
118.—19-chloro-6α,17α-dimethyl-Δ$^{1,4}$-10α-androstadien-17β-ol-3-one.
119.—19-fluoro-6α-methyl-17α-ethinyl-Δ$^{1,4}$-10α-androstadien-17β-ol-3-one.
120.—19-chloro-6α-methyl-17α-ethinyl-Δ$^{1,4}$-10α-androstadien-17β-ol-3-one.

*Example XXV*

Upon treatment of Compounds Nos. 33 to 44, inclusive, by the procedure of Example XXIII, there were respectively produced:

Cpd.
No.
121.—6α-chloro-19-fluoro-Δ$^{1,4}$-10α-androstadien-17β-ol-3-one.
122.—6α,19-dichloro-Δ$^{1,4}$-10α-androstadien-17β-ol-3-one.
123.—6α-chloro-19-fluoro-17α-methyl-Δ$^{1,4}$-10α-androstadien-17β-ol-3-one.
124.—6α,19-dichloro-17α-methyl-Δ$^{1,4}$-10α-androstadien-17β-ol-3-one.
125.—6α-chloro-19-fluoro-17α-ethinyl-Δ$^{1,4}$-10α-androstadien-17β-ol-3-one.
126.—6α,19-dichloro-17α-ethinyl-Δ$^{1,4}$-10α-androstadien-17β-ol-3-one.
127.—6α,19-difluoro-Δ$^{1,4}$-10α-androstadien-17β-ol-3-one.
128.—6α-fluoro-19-chloro-Δ$^{1,4}$-10α-androstadien-17β-ol-3-one.

129.—6α,19-difluoro-17α-methyl-Δ$^{1,4}$-10α-androstadien-17β-ol-3-one.
130.—6α-fluoro-19-chloro-17α-methyl-Δ$^{1,4}$-10α-androstadien-17β-ol-3-one.
131.—6α,19-difluoro-17α-ethinyl-Δ$^{1,4}$-10α-androstadien-17β-ol-3-one.
132.—6α-fluoro-19-chloro-17α-ethinyl-Δ$^{1,4}$-10α-androstadien-17β-ol-3-one.

*Example XXVI*

The Compounds Nos. 63 and 64 were treated according to Example XXIII, thus furnishing respectively: 19-fluoro-17α-vinyl-Δ$^{1,4}$-10α-androstadien-17β-ol-3-one (Cpd. No. 133) and 19-chloro-17α-vinyl-Δ$^{1,4}$-10α-androstadien-17β-ol-3-one (Cpd. No. 134).

*Example XXVII*

The Compounds Nos. 77 to 88, inclusive, upon treatment by the procedure of Example XXIII, afforded respectively:

Cpd.
No.
135.—19-fluoro-Δ$^{1,4,6}$-10α-androstatrien-17β-ol-3-one.
136.—19-chloro-Δ$^{1,4,6}$-10α-androstatrien-17β-ol-3-one.
137.—19-fluoro-17α-methyl-Δ$^{1,4,6}$-10α-androstatrien-17β-ol-3-one.
138.—19-chloro-17α-methyl-Δ$^{1,4,6}$-10α-androstatrien-17β-ol-3-one.
139.—19-fluoro-17α-ethinyl-Δ$^{1,4,6}$-10α-androstatrien-17β-ol-3-one.
140.—19-chloro-17α-ethinyl-Δ$^{1,4,6}$-10α-androstatrien-17β-ol-3-one.
141.—19-fluoro-6-methyl-Δ$^{1,4,6}$-10α-androstatrien-17β-ol-3-one.
142.—19-chloro-6-methyl-Δ$^{1,4,6}$-10α-androstatrien-17β-ol-3-one.
143.—19-fluoro-6,17α-dimethyl-Δ$^{1,4,6}$-10α-androstatrien-17β-ol-3-one.
144.—19-chloro-6,17α-dimethyl-Δ$^{1,4,6}$-10α-androstatrien-17β-ol-3-one.
145.—19-fluoro-6-methyl-17α-ethinyl-Δ$^{1,4,6}$-10α-androstatrien-17β-ol-3-one.
146.—19-chloro-6-methyl-17α-ethinyl-Δ$^{1,4,6}$-10α-androstatrien-17β-ol-3-one.

*Example XXVIII*

The Compounds Nos. 101 and 102 of Example XXII were treated in accordance with Example XXIII, thus yielding respectively: 19-fluoro-17α-vinyl-Δ$^{1,4,6}$-10α-androstatrien-17β-ol-3-one (Cpd. No. 147) and 19-chloro-17α-vinyl-Δ$^{1,4,6}$-10α-androstatrien-17β-ol-3-one (Cpd. No. 148).

*Example XXIX*

The Compounds Nos. 65 to 76, inclusive, were treated in accordance with Example XIX, thus affording the corresponding Δ$^{4,6}$-pregnadiene derivatives.

*Example XXX*

A mixture of 1 g. of 19-fluoro-6β-methyl-Δ$^{4}$-10α-androsten-17β-ol-3-one (Cpd. No. 21), 4 cc. of pyridine and 2 cc. of propionic anhydride was kept at room temperature overnight, poured into ice water, the formed precipitate was filtered, washed with water and dried. Crystallization from acetone-hexane gave 19-fluoro-6β-methyl-Δ$^{4}$-10α-androsten-17β-ol-3-one propionate (Cpd. No. 149).

Upon esterification of Compounds Nos. 22, 27, 28, 33, 34, 39, 40, 51, 52, 57, 58, 77, 78, 83, 89, 95, 103, 109, 121 and 135 by the above procedure, there were respectively obtained:

Cpd.
No.
150.—19-chloro-6β-methyl-Δ$^{4}$-10α-androsten-17β-ol-3-one-propionate.
151.—19-fluoro-6α-methyl-Δ$^{4}$-10α-androsten-17β-ol-3-one-propionate.
152.—19-chloro-6α-methyl-Δ$^{4}$-10α-androsten-17β-ol-3-one propionate.
153.—6α-chloro-19-fluoro-Δ$^{4}$-10α-androsten-17β-ol-3-one-propionate.
154.—6α,19-dichloro-Δ$^{4}$-10α-androsten-17β-ol-3-one propionate.
155.—6α,19-difluoro-Δ$^{4}$-10α-androsten-17β-ol-3-one propionate.
156.—6α-fluoro-19-chloro-Δ$^{4}$-10α-androsten-17β-ol-3-one propionate.
157.—6β-chloro-19-fluoro-Δ$^{4}$-10α-androsten-17β-ol-3-one propionate.
158.—6β,19-dichloro-Δ$^{4}$-10α-androsten-17β-ol-3-one propionate.
159.—6β,19-difluoro-Δ$^{4}$-10α-androsten-17β-ol-3-one propionate.
160.—6β-fluoro-19-chloro-Δ$^{4}$-10α-androsten-17β-ol-3-one propionate.
161.—19-fluoro-Δ$^{4,6}$-10α-androstadien-17β-ol-3-one propionate.
162.—19-chloro-Δ$^{4,6}$-10α-androstadien-17β-ol-3-one propionate.
163.—19-fluoro-6-methyl-Δ$^{4,6}$-10α-androstadien-17β-ol-3-one propionate.
164.—6-chloro-19-fluoro-Δ$^{4,6}$-10α-androstadien-17β-ol-3-one propionate.
165.—6,19-fluoro-Δ$^{4,6}$-10α-androstadien-17β-ol-3-one propionate.
166.—19-fluoro-Δ$^{1,4}$-10α-androstadien-17β-ol-3-one propionate.
167.—19-fluoro-6β-methyl-Δ$^{1,4}$-10α-androstadien-17β-ol-3-one propionate.
168.—6α-chloro-19-fluoro-Δ$^{1,4}$-10α-androstadien-17β-ol-3-one propionate.
169.—19-fluoro-Δ$^{1,4,6}$-10α-androstatrien-17β-ol-3-one propionate.

*Example XXXI*

The starting compounds of the preceding example were treated in accordance with that example, except that propionic anhydride was substituted by caproic anhydride, undecenoic anhydride and cyclopentyl propionic anhydride, thus affording respectively the corresponding caproates, undecenoates and cyclopentyl propionates of said starting compounds.

*Example XXXII*

To a solution of 5 g. of 19-fluoro-17α-methyl-Δ$^{4}$-10α-androsten-17β-ol-3-one (Cpd. No. 11) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-fluoro-17α-methyl-Δ$^{4}$-10α-androsten-17β-ol-3-one caproate (Cpd. No. 170).

Following exactly the same procedure, there were treated the Compounds Nos. 12, 13, 14, 29, 37, 42, 67, 72, 79, 87, 94, 106, 119, 134, 137, 140 and 147, thus furnishing respectively:

Cpd.
No.
171.—19-chloro-17α-methyl-Δ$^{4}$-10α-androsten-17β-ol-3-one caproate.
172.—19-fluoro-17α-ethinyl-Δ$^{4}$-10α-androsten-17β-ol-3-one caproate.
173.—19-chloro-17α-ethinyl-Δ$^{4}$-10α-androsten-17β-ol-3-one caproate.
174.—19-fluoro-6α,17α-dimethyl-Δ$^{4}$-10α-androsten-17β-ol-3-one caproate.

175.—6α-chloro-19-fluoro-17α-ethinyl-Δ⁴-10α-androsten-17β-ol-3-one caproate.
176.—6α-fluoro-19-chloro-17α-methyl-Δ⁴-10α-androsten-17β-ol-3-one caproate.
177.—19-fluoro-6α-methyl-17α-vinyl-Δ⁴-10α-androsten-17β-ol-3-one caproate.
178.—6α-fluoro-19-chloro-17α-vinyl-Δ⁴-10α-androsten-17β-ol-3-one caproate.
179.—19-fluoro-17α-methyl-Δ⁴,⁶-10α-androstadien-17β-ol-3-one caproate.
180.—19-fluoro-6-methyl-17α-ethinyl-Δ⁴,⁶-10α-androstadien-17β-ol-3-one caproate.
181.—6,19-dichloro-17α-ethinyl-Δ⁴,⁶-10α-androstadien-17β-ol-3-one caproate.
182.—19-chloro-17α-methyl-Δ¹,⁴-10α-androstadien-17β-ol-3-one caproate.
183.—19-fluoro-6α-methyl-17α-ethinyl-Δ¹,⁴-10α-androstadien 17β-ol-3-one caproate.
184.—19-chloro-17α-vinyl-Δ¹,⁴-10α-androstadien-17β-ol-3-one caproate.
185.—19-fluoro-17α-methyl-Δ¹,⁴,⁶-10α-androstatrien-17β-ol-3-one caproate.
186.—19-chloro-17α-ethinyl-Δ¹,⁴,⁶-10α-androstatrien-17β-ol-3-one caproate.
187.—19-fluoro-17α-vinyl-Δ¹,⁴,⁶-10α-androstatrien-17β-ol-3-one caproate.

*Example XXXIII*

The starting compounds of the preceding example were treated in accordance with that example, except that caproic anhydride was substituted by acetic anhydride, propionic anhydride and enanthic anhydride, thus furnishing respectively the corresponding acetates, propionates and enanthates of said starting compounds.

I claim:
1. A compound of the following formula:

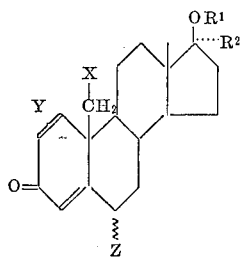

wherein $R^1$ is selected from the group consisting of hydrogen and a hydrocarbon carboxylic acyl group of less than 12 carbon atoms; $R^2$ is a member of the group consisting of hydrogen, lower alkyl, lower alkenyl and lower alkinyl; Z is selected from the group consisting of hydrogen, α-methyl, β-methyl, α-chlorine, β-chlorine, α-fluorine and β-fluorine; Y is a member of the group consisting of a double bond and a saturated linkage between C–1 and C–2; and X is selected from the group consisting of fluorine and chlorine.

2. 19-fluoro-Δ⁴-10α-androsten-17β-ol-3-one.
3. 19-chloro-Δ⁴-10α-androsten-17β-ol-3-one.
4. 19-fluoro-17α-vinyl-Δ⁴-10α-androsten-17β-ol-3-one.
5. 19-chloro-17α-vinyl-Δ⁴-10α-androsten-17β-ol-3-one.
6. 19-chloro-17α-methyl-Δ⁴-10α-androsten - 17β - ol-3-one.
7. 19-fluoro-17α-ethinyl-Δ⁴-10α-androsten-17β-ol-3-one.
8. 19-chloro-17α-ethinyl-Δ⁴-10α-androsten - 17β - ol-3-one.
9. 19-fluoro - 6α,17α - dimethyl-Δ⁴-10α-androsten-17β-ol-3-one.
10. 6α-chloro - 19-fluoro-17α-ethinyl-Δ⁴-10α-androsten-17α-ol-3-one.
11. 6α-fluoro - 19-chloro-17α-methyl-Δ⁴-10α-androsten-17β-ol-3-one.
12. 19-fluoro - 6α - methyl-17α-vinyl-Δ⁴-10α-androsten-17β-ol-3-one.
13. 6α-fluoro - 19 - chloro-17α-vinyl-Δ⁴-10α-androsten-17β-ol-3-one.
14. 19-chloro - 17α - methyl-Δ¹,⁴-10α-androstadien-17β-ol-3-one.
15. 19-fluoro - 6α - methyl-17α,10α-ethinyl-Δ¹,⁴-androstadien-17β-ol-3-one.
16. 19-chloro - 17α - vinyl-Δ¹,⁴-10α-androstadien-17β-ol-3-one.
17. A compound of the following formula:

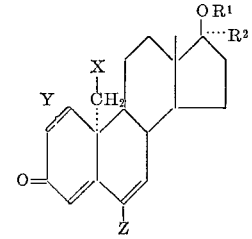

wherein $R^1$ is selected from the group consisting of hydrogen and a hydrocarbon carboxylic acyl group of less than 12 carbon atoms; $R^2$ is a member of the group consisting of hydrogen lower alkyl, lower alkenyl and lower alkinyl; Z is selected from the group consisting of hydrogen, methyl, chlorine, and fluorine; Y is a member of the group consisting of a double bond and a saturated linkage between C–1 and C–2; and X is selected from the group consisting of fluorine and chlorine.

18. 19-fluoro - 17α - methyl-Δ⁴,⁶-10α-androstadien-17β-ol-3-one.
19. 19-fluoro - 6 - methyl-17α-ethinyl-Δ⁴,⁶-10α-androstadien-17β-ol-3-one.
20. 6,19-dichloro - 17α - ethinyl-Δ⁴,⁶-10α-androstadien-17β-ol-3-one.
21. 19-fluoro-17α-methyl-Δ¹,⁴,⁶-10α-andostatrien-17β-ol-3-one.
22. 19-chloro - 17α - ethinyl - Δ¹,⁴,⁶-10α-andostatrien-17β-ol-3-one.
23. 19-fluoro - 17α - vinyl - Δ¹,⁴,⁶-10α-andostatrien-17β-ol-3-one.

No references cited.

LEWIS GOTTS, *Primary Examiner.*